(12) United States Patent
Beuschel et al.

(10) Patent No.: US 10,419,555 B2
(45) Date of Patent: Sep. 17, 2019

(54) COMPUTING SYSTEM AND METHODS FOR ASSOCIATING COMPUTING DEVICES

(71) Applicant: RAKUTEN MARKETING LLC, New York, NY (US)

(72) Inventors: Dana Beuschel, San Francisco, CA (US); Selvakumar Sarangan, Los Altos, CA (US); Satish Krishnamurthy, Cupertino, CA (US)

(73) Assignee: RAKUTEN MARKETING LLC, New York, NY (US)

( * ) Notice: Subject to any disclaimer, the term of this patent is extended or adjusted under 35 U.S.C. 154(b) by 257 days.

(21) Appl. No.: 15/211,734

(22) Filed: Jul. 15, 2016

(65) Prior Publication Data

US 2018/0019924 A1    Jan. 18, 2018

(51) Int. Cl.
*H04L 29/08*        (2006.01)
(52) U.S. Cl.
CPC .............. *H04L 67/18* (2013.01); *H04L 67/12* (2013.01); *H04L 67/22* (2013.01); *H04L 67/303* (2013.01)
(58) Field of Classification Search
CPC .......... H04L 41/12; H04L 67/12; H04L 67/18
USPC ......................................................... 709/223
See application file for complete search history.

(56) References Cited

U.S. PATENT DOCUMENTS

| 9,799,131 | B1 * | 10/2017 | Demiralp | .............. G06T 11/206 |
| 2015/0248706 | A1 * | 9/2015 | Mi | ...................... G06Q 30/0269 |
| | | | | 705/14.53 |
| 2016/0182657 | A1 * | 6/2016 | Mukherjee | .............. H04L 67/22 |
| | | | | 709/223 |
| 2017/0034592 | A1 * | 2/2017 | Ray | .................... G06Q 30/0251 |

* cited by examiner

*Primary Examiner* — Glenford J Madamba
(74) *Attorney, Agent, or Firm* — Troutman Sanders LLP

(57) ABSTRACT

Certain implementations of the disclosed technology may include computing systems and methods for associating computing devices. According to an example implementation, a computer-implemented method is provided. The method may include determining a first set of content items associated with a first computing device and determining a second set of content items associated with a second computing device. The method may also include determining whether the first and second computing devices constitute a candidate pair. The method may also include calculating s similarity metric between the first and second computing devices based on a common set of content items shared between the devices. Finally, the method may include associating the first and second computing devices with one another.

7 Claims, 4 Drawing Sheets

COMPUTING SYSTEM AND METHODS FOR ASSOCIATING COMPUTING DEVICES

BACKGROUND

With the recent proliferation of personal computing devices, individuals frequently use a plurality of different computing devices. For example, it is common for a given individual to own and use one or more of a tablet, laptop computer, desktop computer, smartphone, personal digital assistant (PDA), etc. However, conventional computing systems are incapable of recognizing that different computing devices are owned and/or used by a single individual. Rather, each discrete computing device is externally perceived (e.g., by a computing system in communication with any given computing device) as its own "island." Consequently, conventional computing systems are unable to make use of the fact that a plurality of given computing devices may be owned and/or used by a single individual so as to, for example, tailor specific content to that individual, ensure uniform configurations/settings across the plurality of commonly owned computing devices, and/or for a variety of Internet of Things (TOT) applications. Accordingly, improved computing systems and methods are desired for associating commonly owned/used computing devices with one another.

SUMMARY OF THE INVENTION

The computing system and techniques set forth herein provide simple, intuitive, scalable systems and techniques for associating pairs of computing devices based on the similarity of the content consumed. The technology disclosed herein builds on top of location/IP-based methods to provide an advantageous, additional layer of filtering based on user behavior and interests.

Assume a universe of content items, A. As used herein, "content items" refers to content accessible on a computing device, which may be used to ascertain the owner, or primary user, of the computing device. By way of example and not limitation, content items may include applications, websites, images, videos, textual documents, etc. Content items can be matched across computing devices algorithmically (e.g., via string matching on pub name), manually, or a combination of the two. Also, assume a universe of computing devices, identified, for example, by a device ID, cookie, user agent, or similar device identification information. Each device i is associated with a set of content items, $A_i \subset A$, which it has accessed, either within a specific timeframe or in its lifetime. From this, a frequency score can be calculated for each content item, where N is the total number of computing devices. In one embodiment, the frequency score may be defined as:

$$Pa = \frac{\sum_{i=1}^{N} 1\{a \in A_i\}}{N}$$

In one embodiment, a pair of computing devices, i and j, are considered a candidate pair if they were observed on the same internet protocol (IP) address (e.g., the same public IP address) close to the same time, i.e., within a predetermined timeframe. For each candidate pair, a similarity metric may be calculated as follows:

$$S_{ij} = \frac{\sum_{a \in A_i \cap A_j} -\log(Pa)}{|A_i \cup A_j|}$$

Conceptually, the computing system and techniques described herein are premised on an assumption that two computing devices owned (or primarily used) by the same user are likely to have a more similar content history than two devices owned by different people. This may result from either preferences across, or within, content categories. Weighting each content item by −log(Pa) gives higher weight to content items that are less frequently seen across devices, and thus, less likely to co-occur due to chance. The sum may be normalized by the size of the union of the two device's content items because if one or both computing devices use a significant number of content items, they are more likely to have some in common purely due to chance.

The framework above can easily be modified to incorporate additional data. For instance, the function in the numerator can be weighted by frequency of usage, or some content items could be aggregated up to the content category level. Combinations of popular content items (e.g., regularly accessed applications and/or websites) can be used by adding those combinations to A. The Pa vector can also, in some embodiments, be calculated at the metro level to account for city-specific content items, such as local news.

BRIEF DESCRIPTION OF THE FIGURES

Reference will now be made to the accompanying Figures, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein.

Example implementations of the disclosed technology provide computing systems and methods for associating computing devices based upon, for example, common content items accessed across one or more computing devices.

Example implementations of the disclosed technology will now be described with reference to the accompanying figures.

Figure 1:
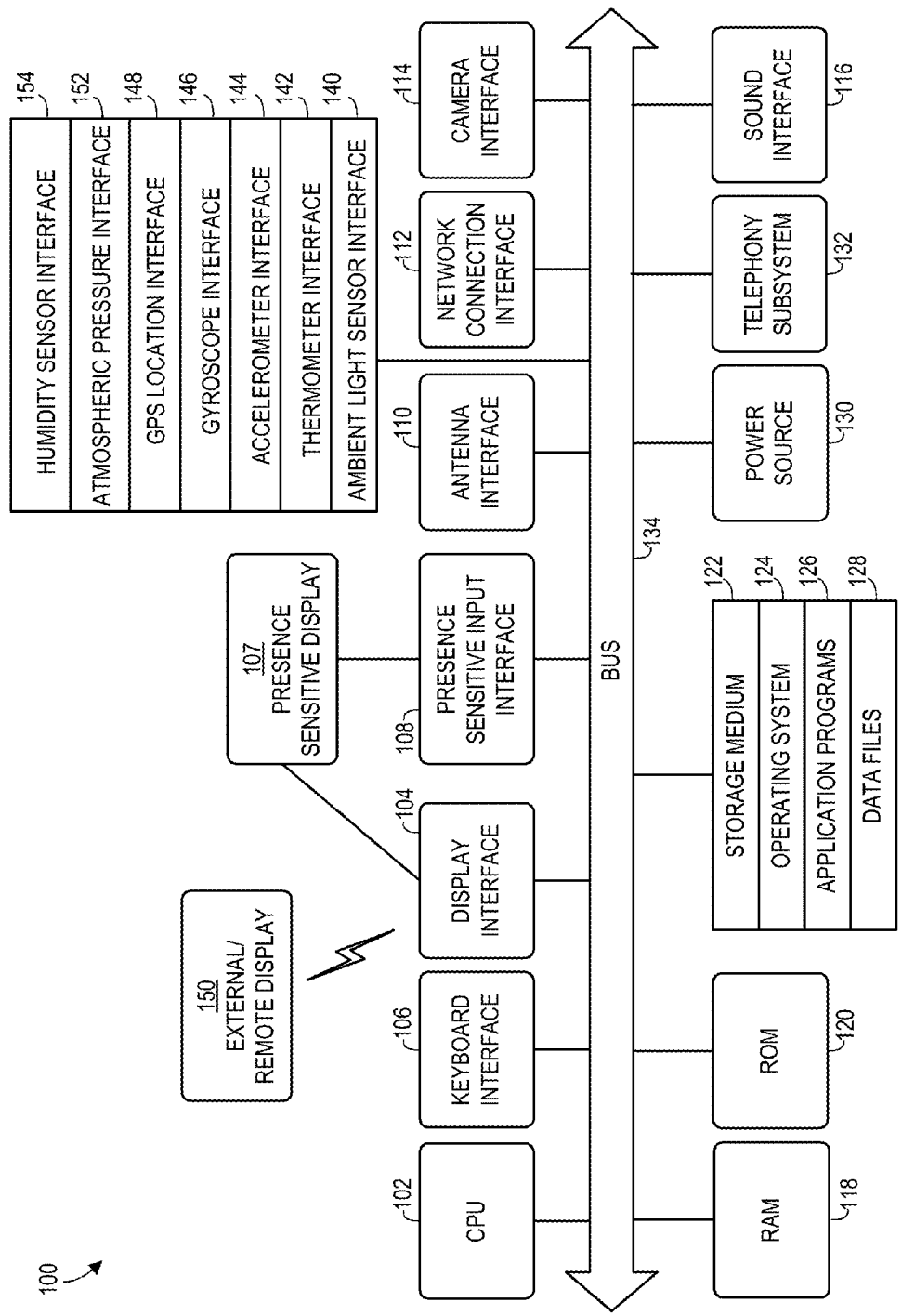
FIG. 1 depicts computing system architecture 100, according to an example implementation of the disclosed technology.

As desired, implementations of the disclosed technology may include a computing device with more or less of the components illustrated in FIG. 1. The computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where executable computer instructions are processed; a display interface 104 that supports a graphical user interface and provides functions for rendering video, graphics, images, and texts on the display. In certain example implementations of the disclosed technology, the display interface 104 connects directly to a local display, such as a touch-screen display associated with a mobile computing device. In another example implementation, the display interface 104 provides data, images, and other information for an external/remote display 150 that is not necessarily physically connected to the computing device. For example, a desktop monitor can mirror graphics and other information presented on a mobile computing device. In certain example implementations, the display interface 104 wirelessly communicates, for example, via a Wi-Fi channel or other available network connection interface 112 to the external/remote display.

In an example implementation, the network connection interface 112 can be configured as a wired or wireless communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 can include a keyboard interface 106 that provides a communication interface to a physical or virtual keyboard. In one example implementation, the computing device architecture 100 includes a presence-sensitive display interface 108 for connecting to a presence-sensitive display 107. According to certain example implementations of the disclosed technology, the presence-sensitive input interface 108 provides a communication interface to various devices such as a pointing device, a capacitive touch screen, a resistive touch screen, a touchpad, a depth camera, etc. which may or may not be integrated with a display.

The computing device architecture 100 can be configured to use one or more input components via one or more of input/output interfaces (for example, the keyboard interface 106, the display interface 104, the presence sensitive input interface 108, network connection interface 112, camera interface 114, sound interface 116, etc.) to allow the computing device architecture 100 to present information to a user and capture information from a device's environment including instructions from the device's user. The input components can include a mouse, a trackball, a directional pad, a track pad, a touch-verified track pad, a presence-sensitive track pad, a presence-sensitive display, a scroll wheel, a digital camera including an adjustable lens, a digital video camera, a web camera, a microphone, a sensor, a smartcard, and the like. Additionally, an input component can be integrated with the computing device architecture 100 or can be a separate device. As additional examples, input components can include an accelerometer, a magnetometer, a digital camera, a microphone, and an optical sensor.

Example implementations of the computing device architecture 100 can include an antenna interface 110 that provides a communication interface to an antenna; a network connection interface 112 can support a wireless communication interface to a network. As mentioned above, the display interface 104 can be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where executable computer instructions and data can be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files include an operating system 124, application programs 126 (including, for example, a web browser application, a widget or gadget engine, and or other applications, as necessary), and data files 128. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive audio and data information over a telephone network. Although shown as a separate subsystem, the telephony subsystem 132 may be implemented as part of the network connection interface 112. The constituent components and the CPU 102 communicate with each other over a bus 134.

According to an example implementation, the CPU 102 has appropriate structure to be a computer processor. In one arrangement, the CPU 102 includes more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 in order to execute software programs. Data can be stored in the RAM 118, where the data can be accessed by the computer CPU 102 during execution. In one example configuration, the device architecture 100 includes at least 128 MB of RAM, and 256 MB of flash memory.

The storage medium 122 itself can include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system, can be tangibly embodied in storage medium 122, which can include a machine-readable storage medium.

According to one example implementation, the term computing device, as used herein, can be a CPU, or conceptualized as a CPU (for example, the CPU 102 of FIG. 1). In this example implementation, the computing device (CPU) can be coupled, connected, and/or in communication with one or more peripheral devices, such as display. In another example implementation, the term computing device, as used herein, can refer to a mobile computing device such as a smartphone, tablet computer, or smart watch. In this example implementation, the computing device outputs content to its local display and/or speaker(s). In another example implementation, the computing device outputs content to an external display device (e.g., over Wi-Fi) such as a TV or an external computing system.

In example implementations of the disclosed technology, a computing device includes any number of hardware and/or software applications that are executable to facilitate any of the operations. In example implementations, one or more I/O interfaces facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., can facilitate user interaction with the computing device. The one or more I/O interfaces can be utilized to receive or collect data and/or user instructions from a wide variety of input devices. Received data can be processed by one or more computer processors as desired in various implementations of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

The computing device architecture 100 illustrated in FIG. 1 and described above may apply to the computing devices 202, 204 and/or the computing system 208 described below with regard to FIG. 2, as will be understood by one having ordinary skill in the art.

Figure 2:
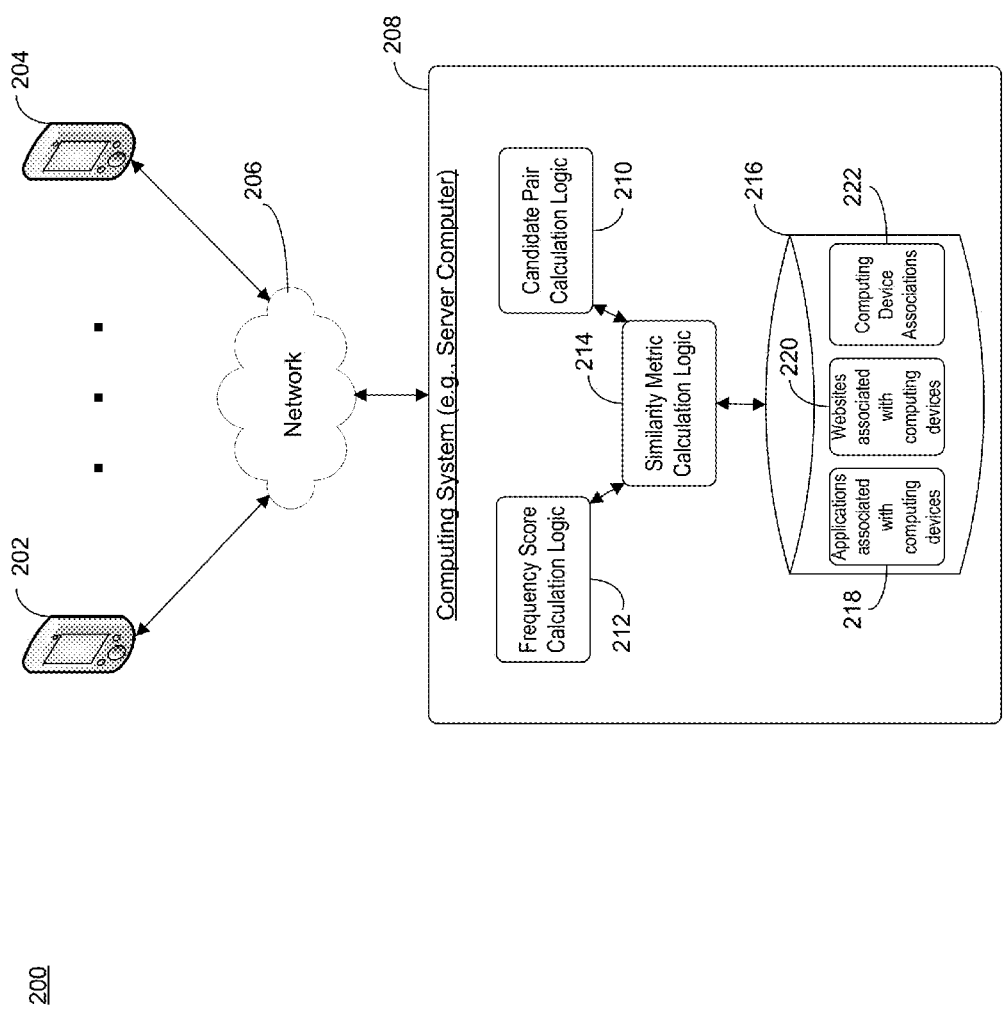
FIG. 2 illustrates a networked system for associating computing devices in accordance with an exemplary embodiment of the disclosed technology.

FIG. 2 illustrates a networked system 200 for associating computing devices. As shown, the networked system 200 includes a first computing device 202 and a second computing device 204 communicatively coupled to a computing system 208 (e.g., one or more server computers) over a network 208. While FIG. 2 only illustrates first and second computing devices 202, 204, those having ordinary skill in the art will appreciate that any number of computing devices may communicatively coupled to the computing system 208 without deviating from the teachings of the instant disclosure. Furthermore, those having ordinary skill in the art will recognize that the network 206 may be implemented as any suitable wired or wireless network, as desired. Further still, while the computing system 208 is depicted as a single computing system 208, those having ordinary skill in the art will understand that the computing system 208 may include any suitable number of discrete, communicatively coupled computing systems, each of which may include one or more processors and/or memory. In one exemplary embodiment, the computing system 208 may include one or more server computers configured for communication with one another, and with any number of computing devices (e.g., the first computing device 202 and the second computing device 204) over the network 206.

The computing devices (e.g., the first computing device 202 and the second computing device 204) may take the form of any suitable computing devices including, but not limited to, desktop computers, laptop computers, tablets, smartphones, PDAs, mobile phones, etc.

The computing system 208 includes candidate pair calculation logic 210, frequency score calculation logic 212, similarity metric calculation logic 214, and a database 216. Logical components 210, 212, and 214 may be implemented as hardware, software, firmware, or any combination thereof. For example and not by way of limitation, in one embodiment, one or more of the logical components 210, 212, and 214 may be implemented as application-specific integrated circuits (ASICs). In another exemplary embodiment, one or more of the logical components 210, 212, and 214 may be implemented as computer-executable program instructions capable of being executed by one or more processors, such as one or more processors of the computing system 208. The computing system 208 may also include a database 216 storing, for example, data describing content items associated with computing devices 218 and data describing computing device associations 226. The data describing content items associated with computing devices 218 may include, by way of example and not limitation, data describing applications associated with computing devices 220, data describing websites associated with computing devices 222, data describing images associated with computing devices 224, etc. For example, in some embodiments (not shown), the data describing content items associated with computing devices 218 may additionally, or alternatively, include data describing videos associated with computing devices, data describing textual documents associated with computing devices, etc.

The data describing applications associated with computing devices 220 may include, for example, data identifying applications associated with respective computing devices. In one exemplary embodiment, an application is associated with a computing device if the application is installed on the computing device. In another example, an application is associated with a computing device if the application has been accessed (i.e., executed) on the computing device within a predetermined timeframe.

The data describing websites associated with computing devices 222 may include, for example, data identifying websites associated with respective computing devices. In one exemplary embodiment, a website is associated with a computing device if the website has ever been accessed on the computing device (e.g., via a web browser application installed on the computing device). In another example, a website is associated with a computing device if the website has been accessed on the computing device within a predetermined timeframe.

The data describing images associated with computing devices 224 may include, for example, data identifying images associated with respective computing devices. In one exemplary embodiment, an image is associated with a computing device if the image is stored on the computing device. In another example, an image is associated with a computing device if the image has been accessed (e.g., viewed) on the computing device within a predetermined timeframe.

The data describing computing device associations 226 may include, for example, data identifying associations between one or more computing devices following the computing device association processing set forth herein. In one embodiment, the data describing computing device associations 226 may be implemented as an index or the like identifying associations between disparate computing devices. For example, for a given computing device A, the data describing computing device associations 226 may include data identifying all of the other computing devices that are deemed to be associated with computing device A in line with the techniques disclosed herein. Continuing with this example, the data describing computing device associations 226 may indicate, for instance, that computing device A is associated with computing device B. In another example, the data describing computing device associations 226 may indicate, for instance, that computing device A is associated with (i) computing device B, (ii) computing device C, and (iii) computing device D. That is to say, each computing device may be associated with one or more additional computing devices and there is no limit on the number of associations between computing devices. In another embodiment, the data describing computing device associations 226 may be implemented as a table containing pairs of computing devices with respective probabilities of association. For example, the table may include data such as (i) computing device A is associated with computing device B with a probability of 0.97, (ii) computing device A is associated with computing device C with a probability of 0.97, and (iii) computing device D is associated with computing device E with a probability of 0.99.

In operation, the networked system 200 for associating computing devices with one another may function as follows. Again, while the following discussion focuses on determining whether two computing devices (e.g., first computing device 202 and second computing device 204) should be associated with one another, the techniques set forth herein may be suitably applied to determine whether any number of computing devices should be associated with one another. At the outset, the computing system 208 obtains computing device data from each of the first and second computing device 202, 204. As used herein, obtaining may include (i) retrieving the computing device data from each computing device 202, 204 (i.e., "pulling" the relevant data) or (ii) receiving the computing device data from each computing 202, 204 without the computing system 208 issuing one or more specific requests for the computing device data (i.e., having the computing device data "pushed" to the computing system 208 from the first and second computing devices 202, 204), either directly or via intermediaries such as ad exchanges and/or data providers. The computing device data may include (i) data identifying the specific content items accessed and/or stored on a given computing device, (ii) data describing when each of the content items were accessed and/or stored on a given computing device, (iii) data describing one or more internet protocol (IP) addresses associated with a given computing device, and/or (iv) data describing one or more geolocations associated with a given computing device. In some embodiments, only a portion of foregoing types of computing device data may be necessary in order to determine whether two or more computing devices should be associated with one another. In other embodiments, all of the foregoing different types of computing device data may be utilized in order to determine whether two or more computing devices should be associated with one another.

Upon receipt of the computing device data from the first and second computing devices 202, 204, the computing system 208 (i.e., logic in the computing system 208, which may be implemented in any number of different ways in accordance with the foregoing discussion concerning logical components 210, 212, and 214) is configured to determine a first set of content items (e.g., applications, websites, images, etc.) associated with the first computing device 202 and a second set of content items (e.g., applications, websites, images, etc.) associated with the second computing device 204. Determining which content items are associated with the first computing device 202 may involve, in one example, analyzing the relevant data obtained from the first computing device 202 to determine which content items are stored on the first computing device 202. In another example, determining which content items are associated with the first computing device 202 may involve analyzing the relevant data obtained from the first computing device 202 to identify specific content items that have been accessed (e.g., executed in the case of applications, visited in the case of web sites, viewed in the case of images, etc.) on the first computing device within a predetermined timeframe.

As used herein, a "predetermined timeframe" may include any suitable timeframe according to, for example, design preferences. For example, in one embodiment, the predetermined timeframe could be within the past five minutes. In another embodiment, the predetermined timeframe could be within the past five days. In still another embodiment, the predetermined timeframe could be the past five years. Thus, any suitable predetermined timeframe may be utilized without deviating from the teachings of this disclosure.

Furthermore, while the preceding discussion has focused on determining a first set of content items associated with the first computing device 202, those having ordinary skill in the art will appreciate that the same techniques may be applied in order for the computing system 208 to determine a second set of content items associated with the second computing device 204.

Continuing with the operation of the networked system 200, the candidate pair calculation logic 210 of the computing system 208 is configured to determine whether the first computing device 202 and the second computing device 204 constitute a candidate pair (i.e., a pair of devices that may be associated with one another). In one exemplary embodiment, the candidate pair calculation logic 210 is configured to determine whether the first computing device 202 and the second computing device 204 constitute a candidate pair by determining whether the first computing device 202 and the second computing device 204 have utilized the same public IP address within a predetermined timeframe. This determination may be based on the computing device data obtained from the first and second computing devices 202, 204. For example, if it is known that the first and second computing devices 202, 204 accessed the same wireless router (and, therefore, utilized the same public IP address) within a predetermined timeframe, this could signal that the first and second computing devices 202, 204 are owned/primarily utilized by the same person. If the candidate pair calculation logic 210 determines that the first computing device 202 and the second computing device 204 have utilized the same public IP address within the predetermined timeframe, the first and second computing device 202, 204 will be treated as a candidate pair and a similarity metric may be calculated between the devices 202, 204 in line with the discussion that follows.

The similarity metric calculation logic 214 is configured to calculate a similarity metric (i.e., a quantitative measurement indicating the likelihood that the first and second computing devices are owned/primarily used by the same individual and, thus, should be associated with one another) between the first and second computing devices 202, 204 if the candidate pair calculation logic 210 determines that the first and second computing devices 202, 204 constitute a candidate pair. The similarity metric calculation logic 214 is configured to calculate the similarity metric based on at least a common set of content items associated with each of the first and second computing devices 202, 204. The common set of content items may include one or more applications associated with both the first and second computing device 202, 204, one or more websites associated with both the first and second computing device 202, 204, one or more images associated with both the first and second computing device 202, 204, etc. The similarity metric calculation logic 214 may, therefore, utilize the data describing content items associated with computing devices 218 stored in the database 216 when calculating the similarity metric.

In one exemplary embodiment, the similarity metric calculation logic 214 may also utilize a frequency score calculation, tied to each content item associated with the first and second computing devices 202, 204, in calculating the similarity metric between the two devices 202, 204. Specifically, the frequency score calculation logic 212 is configured to calculate a quantitative frequency score for each content item included as part of the first set of content items associated with the first computing device 202 and/or the second set of content items associated with the second computing device 204. Each frequency score is intended to reflect the frequency with which a given content item is accessed across all computing devices under consideration (e.g., the frequency with which a given application/web site/image/etc. is accessed across both the first and second computing devices 202, 204). Frequency score calculations may prove useful in identifying common/popular content items that are widely accessed across all computing devices and, consequently, provide very little information about whether a particular device is owned/primarily utilized by a particular person.

In one exemplary embodiment, a frequency score for a given content item may be calculated as follows. Assume a universe of content items, A. Content items can be matched across computing devices algorithmically (e.g., via string matching on pub name), manually, or a combination of the two. Also, assume a universe of computing devices, identified, for example, by a device ID, cookie, user agent, or similar device identification information. Each device i is associated with a set of content items, $A_i \subset A$, which it has accessed, either within a specific timeframe or in its lifetime. From this, a frequency score may be calculated for each content item, where N is the total number of computing devices. In one embodiment, the frequency score may be defined as:

$$Pa = \frac{\sum_{i=1}^{N} 1\{a \in A_i\}}{N}$$

In one exemplary embodiment, frequency score calculations may be utilized by the similarity metric calculation logic 214 in calculating the similarity metric between the first and second computing devices 202, 204. For example, with regard to a candidate pair of computing devices i and j (as determined, for example, by the candidate pair calculation logic 210), a similarity metric may be calculated as follows:

$$S_{ij} = \frac{\sum_{a \in A_i \cap A_j} -\log(Pa)}{|A_i \cup A_j|}$$

Weighting each content item by −log(Pa) gives higher weight to content items that are less frequently seen across computing devices, and thus, less likely to co-occur due to chance. The sum may be normalized by the size of the union of the two device's content items because if one or both computing devices include a significant number of content items, they are more likely to have some in common purely due to chance.

In addition to calculating a similarity metric between the first and second computing devices 202, 204, the similarity metric calculating logic 214 may also determine whether a given calculated similarity metric exceeds a predetermined threshold. The value of the predetermined threshold is a design choice, and any suitable threshold(s) may be utilized without departing from the teachings of the instant disclosure. In response to determining that a calculated similarity metric exceeds the predetermined threshold, the similarity metric calculation logic 214 may associate/generate an association between the first and second computing devices 202, 204. In some embodiments, associating the first and second computing devices 202, 204 with one another/generating an association between the first and second computing devices, 202, 204 may entail updating an index identifying the first and second computing devices 202, 204 as being associated with one another. Such an index may be included as part of the data describing computing device associations 226 stored in the database 216. In another example, associating the first and second computing devices 202, 204 with one another/generating an association between the first and second computing devices, 202, 204 may entail generating a pointer from data describing the first computing device 202 to data describing the second computing device 204 (along with, in some embodiment, a probability of association), and vice versa. This pointer information may also be included as part of the data describing computing device associations 226 stored in the database 216.

In some embodiments, once an association is created between two computing devices (e.g., the first and second computing devices 202, 204), the association information may be utilized to direct specific content to the first computing device 202 and/or the second computing device 204 based on the association between the devices. For example, in one embodiment, specific media content (e.g., advertisements, music, video, images, textual content, websites, etc.) may be directed (e.g., transmitted directly via the computing system 208 or transmitted indirectly via, for example, one or more third party computing systems) to the first computing device 202 and/or the second computing device 204 based on the association between the devices. In another embodiment, device configuration values (e.g., values affecting operational settings of a given computing device) may be directed/transmitted to the first computing device 202 and/or the second computing device 204 based on the association between the devices. Device configuration values may include, by way of example and not limitation, screen brightness, volume, which icons/shortcuts should be displayed as part of a user-interface, power conservation settings (e.g., how long until the computing device enters sleep mode), etc.

Figure 3:
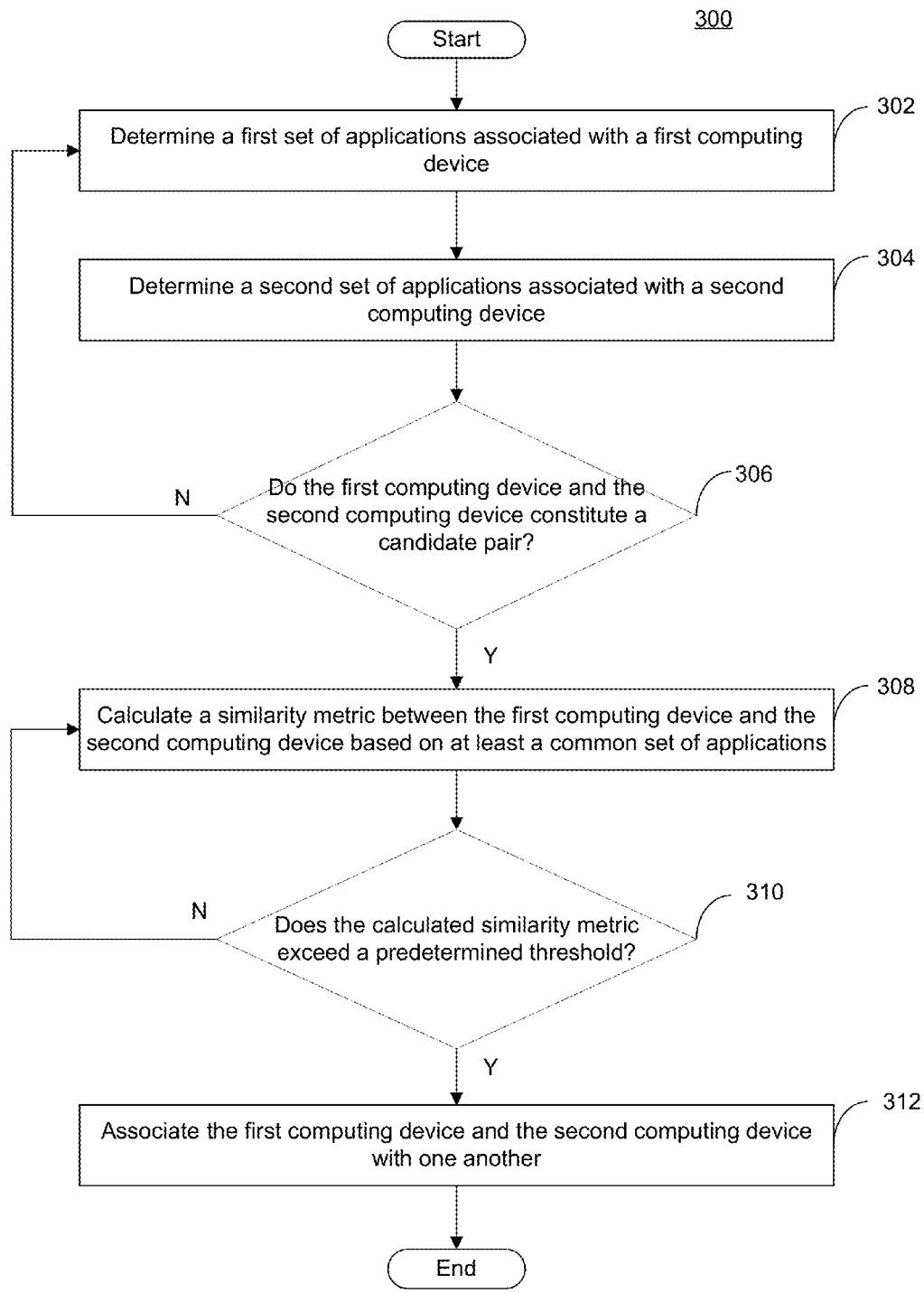
FIG. 3 is a flowchart illustrating a method for associating computing devices in accordance with an exemplary embodiment of the disclosed technology.
Figure 4:
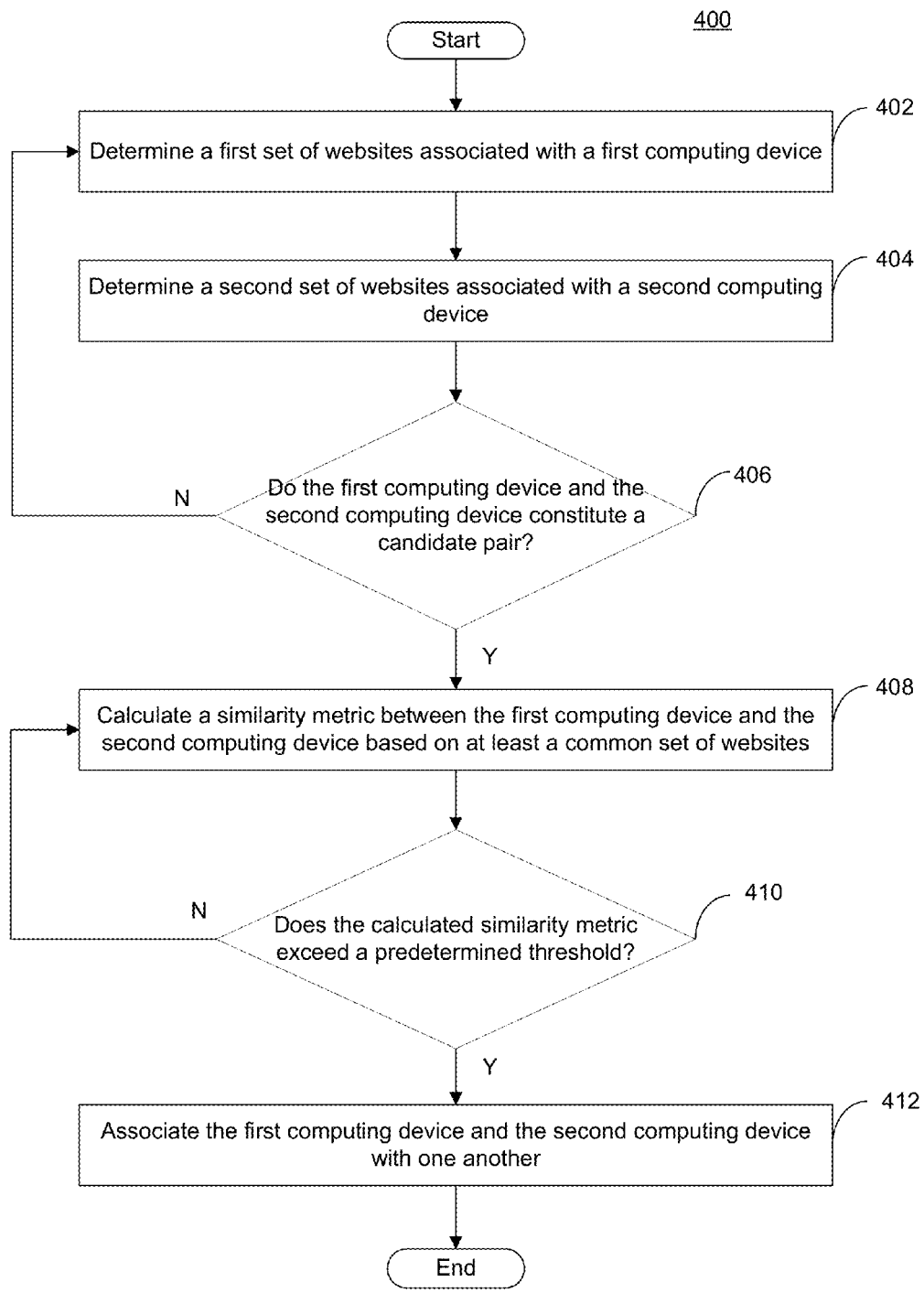
FIG. 4 is a flowchart illustrating a method for associating computing devices in accordance with an exemplary embodiment of the disclosed technology.

FIG. 3 is flow chart of a method 300 for associating computing devices according to an example implementation of the disclosed technology. The method 300 begins at block 302 where a processor, such as CPU 102 of FIG. 1, determines a first set of content items associated with a first computing device. At block 304, the processor determines a second set of content items associated with a second computing device. At block 306, a determination is made as to whether the first computing device and the second computing device constitute a candidate pair. If so, the process continues to block 308. If not, the process may return to block 302. At block 308, the processor calculates a similarity metric between the first computing device and the second computing device based on at least a common set of content items. At block 310, a determination is made as to whether the calculated similarity metric exceeds a predetermined threshold. If so, the process continues to block 312. If not, the process may return to block 308. At block 312, the processor associates the first computing device with the second computing device/generates an association between the first computing device and the second computing device.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to computing devices. Those skilled in the art recognize that there are several categories of computing devices. For example, computing devices can include, but are not limited to portable computers, tablet PCs, Internet tablets, PDAs, ultra mobile PCs (UMPCs) smartphones, and/or desktop computers.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
   determining, by a processor, a first set of content items that have been accessed on a first computing device within the first predetermined timeframe;
   determining, by the processor, a second set of content items that have been accessed on a second computing device within the first predetermined timeframe;
   calculating, by the processor, a frequency score for each content item of the first set of content items and the second set of content items, each frequency score representing a frequency with which a given content item has been accessed over the first predetermined timeframe across the first and second computing devices;
   determining, by the processor, whether the first computing device and the second computing device constitute a candidate pair of computing devices, by determining whether the first computing device and the second computing device have utilized the same public IP address within a second, predetermined timeframe;
   in response to determining that the first computing device and second computing device constitute a candidate pair of computing devices, calculating, by the processor, a similarity metric between the first computing device and the second computing device based at least on the calculated frequency score for each content item, wherein the calculation of the similarity metric includes weighting each content item based on its frequency score such that content items not frequently accessed are given a weight higher than content items frequently accessed; and
   in response to determining that the calculated similarity metric exceeds a predetermined threshold, associating, by the processor, the first computing device and the second computing device with one another as used by a single individual.

2. The computer-implemented method of claim 1, wherein determining whether the first computing device and the second computing device constitute the candidate pair of computing devices comprises determining whether the first computing device and the second computing device have been detected within a predetermined spatial vicinity of one another at any point in time.

3. The computer-implemented method of claim 1, further comprising:
   generating digital content based on the association between the first computing device and the second computing device; and
   transmitting the generated digital content to at least one of the first computing device and the second computing device.

4. The computer-implemented method of claim 1, wherein the content items comprise at least one of:
   applications;
   web sites;
   images; and
   videos.

5. The computer-implemented method of claim 1, wherein associating the first computing device and the second computing device with one another comprises at least one of:
   updating an index identifying the first and second computing devices as being associated with one another;
   generating a first pointer from data describing the first computing device to data describing the second computing device; and
   generating a second pointer from data describing the second computing device to data describing the first computing device.

6. A computing system comprising:
   memory comprising executable instructions; and
   a processor operatively connected to the memory, the processor configured to execute the executable instructions in order to effectuate a method comprising:
   determining a first set of content items that have been accessed on a first computing device within a first predetermined timeframe;
   determining a second set of content items that have been accessed on a second computing device within a first predetermined timeframe;
   calculating, by the processor, a frequency score for each content item of the first set of content items and the second set of content items, each frequency score representing a frequency with which a given content item has been accessed over the first predetermined timeframe across the first and second computing devices;
   determining whether the first computing device and the second computing device constitute a candidate pair of computing devices, by determining whether the first computing device and the second computing device have utilized the same public IP address within a second predetermined timeframe;
   in response to determining that the first computing device and second computing device constitute a candidate pair of computing devices, calculating a similarity metric between the first computing device and the second computing device based at least on the calculated frequency score for each content item, wherein the calculation of the similarity metric includes weighting each content item based on its frequency score such that content items not frequently accessed are given a weight higher than content items frequently accessed; and
   in response to determining that the calculated similarity metric exceeds a predetermined threshold, associating the first computing device and the second computing device with one another as used by a single individual.

7. A non-transitory computer-readable medium comprising executable instructions that when executed by a processor cause the processor to effectuate a method comprising:

determining a first set of content items that have been accessed on a first computing device within a first predetermined timeframe;

determining a second set of content items that have been accessed on a second computing device within the first predetermined timeframe;

calculating a frequency score for each content item of the first set of content items and the second set of content items, each frequency score representing a frequency with which a given content item has been accessed over the first predetermined timeframe across the first and second computing devices;

determining whether the first computing device and the second computing device constitute a candidate pair of computing devices, by determining whether the first computing device and the second computing device have utilized the same public IP address within a second predetermined timeframe;

in response to determining that the first computing device and second computing device constitute a candidate pair of computing devices, calculating a similarity metric between the first computing device and the second computing device based at least on the calculated frequency score for each content item, wherein the calculation of the similarity metric includes weighting each content item based on its frequency score such that content items not frequently accessed are given a weight higher than content items frequently accessed; and in response to determining that the calculated similarity metric exceeds a predetermined threshold, associating the first computing device and the second computing device with one another as used by a single individual.

* * * * *